United States Patent
Khan et al.

Patent Number: 6,163,826
Date of Patent: Dec. 19, 2000

[54] METHOD AND APPARATUS FOR NON-CONCURRENT ARBITRATION OF MULTIPLE BUSSES

[75] Inventors: Asif Q. Khan, Austin; James O. Mergard, Pflugerville, both of Tex.

[73] Assignee: Advanced Micro Devices, Inc., Sunnyvale, Calif.

[21] Appl. No.: 09/378,985

[22] Filed: Aug. 23, 1999

[51] Int. Cl.[7] ................................................... G06F 13/00
[52] U.S. Cl. .................... 710/107; 710/110; 710/128; 710/129; 710/240
[58] Field of Search .................... 710/110, 107, 710/113, 119, 240, 126, 128, 129

[56] References Cited

U.S. PATENT DOCUMENTS

| | | | |
|---|---|---|---|
| 5,418,914 | 5/1995 | Heil et al. | 710/113 |
| 5,619,661 | 4/1997 | Crews et al. | 710/119 |

OTHER PUBLICATIONS

PCI System Architecture, Fourth Edition, Copyright ©1999, by Mindshare, Inc., title page and pp. 649–671.

*Primary Examiner*—Ario Etienne
*Attorney, Agent, or Firm*—Akin, Gump, Strauss, Hauer & Feld, LLP

[57] ABSTRACT

A processor-based system such as a microcontroller supports a non-concurrent mode in which a bus master requesting ownership of a peripheral bus is forced to acquire ownership of both the peripheral bus and a processor bus. The system includes a peripheral bus arbiter to detect a peripheral bus request for the peripheral bus by a bus master, to generate a processor bus request for the processor bus in response to detecting the peripheral bus request, and to grant the bus master ownership of the peripheral bus if the bus master is granted ownership of the processor bus. The peripheral bus arbiter maintains ownership of the processor bus by the bus master until the bus master releases ownership of the peripheral bus. Similarly, a bus master seeking ownership of the processor bus can be forced to acquire ownership of the peripheral bus. The non-concurrent mode can be applied to various multi-bus architectures. One advantage of the non-concurrent mode is improved debug capability.

20 Claims, 4 Drawing Sheets

SYSARBCTL

| Bit | 7 | 6 | 5 | 4 | 3 | 2 | 1 | 0 |
|---|---|---|---|---|---|---|---|---|
| | | | RESERVED | | | BUS_PARK_SEL | CNCR_MODE_ENB | GNT_TO_INT_ENB |
| Reset | 0 | 0 | 0 | 0 | 0 | 0 | 0 | 0 |
| R/W | | | RSV | | | R/W | R/W | R/W |

METHOD AND APPARATUS FOR NON-CONCURRENT ARBITRATION OF MULTIPLE BUSSES

BACKGROUND OF THE INVENTION

1. Field of the Invention

The present invention generally relates to arbitrating access to a processor bus and a peripheral bus and more particularly to a processor-based system configured for a non-concurrent mode in which a bus master is forced to acquire ownership of both the processor bus and the peripheral bus.

2. Description of the Related Art

In processor-based systems providing a processor bus and a peripheral bus such as a peripheral component interconnect (PCI) bus, transactions on the processor bus have occurred simultaneously with transactions on the peripheral bus. Similarly, processor-based systems which provide multiple peripheral buses have supported simultaneous transactions on peripheral buses. By supporting simultaneous transactions on multiple buses, conventional processor-based systems have provided optimal utilization of multiple buses.

Concurrent bus activity by multiple bus masters on multiple buses, however, has frustrated efforts to effectively debug processor-based systems. A bus transaction on one bus by a bus master frequently has unacceptable or unforeseeable affects on a simultaneous bus transaction on a different bus by another bus master. Debugging of processor-based systems with concurrent bus activity by multiple bus masters on multiple buses thus has historically been limited in favor of optimal utilization of multiple buses.

SUMMARY OF THE INVENTION

Briefly, a processor-based system such as a microcontroller supports a non-concurrent mode in which a bus master requesting ownership of a peripheral bus is forced to acquire ownership of both the peripheral bus and a processor bus. The system includes a peripheral bus arbiter to detect a peripheral bus request for the peripheral bus by a bus master, to generate a processor bus request for the processor bus in response to detecting the peripheral bus request, and to grant the bus master ownership of the peripheral bus if the bus master is granted ownership of the processor bus. The peripheral bus arbiter maintains ownership of the processor bus by the bus master until the bus master releases ownership of the peripheral bus. Similarly, a bus master seeking ownership of the processor bus can be forced to acquire ownership of the peripheral bus. The non-concurrent mode can be applied to various multi-bus architectures. One advantage of the non-concurrent mode is improved debug capability.

BRIEF DESCRIPTION OF THE DRAWINGS

A better understanding of the illustrative system can be obtained when the following detailed description of the disclosed embodiment is considered in conjunction with the following drawings, in which.

DETAILED DESCRIPTION OF PREFERRED EMBODIMENT

Microcontroller

Figure 1:
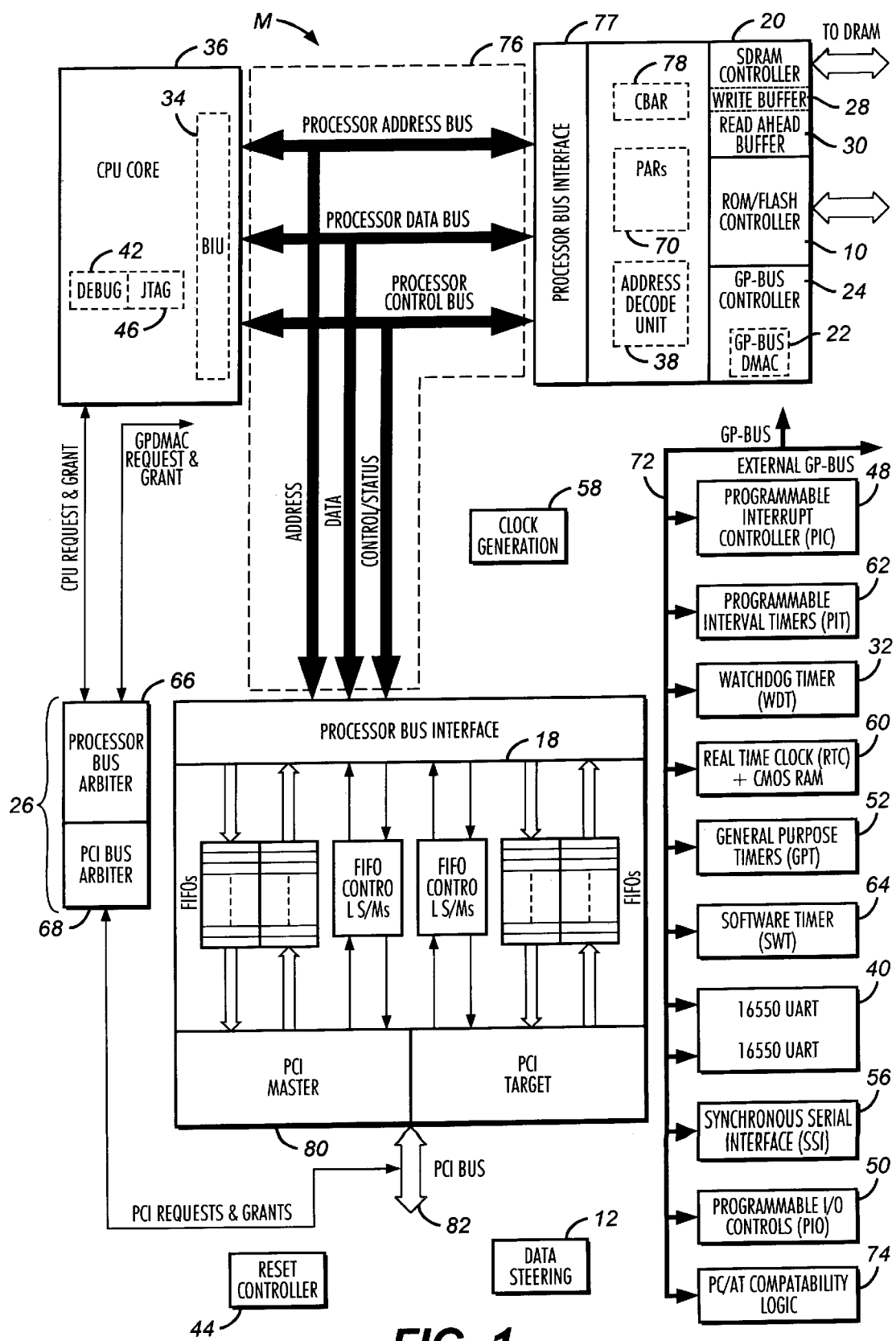
FIG. 1 is a block diagram of a microcontroller.

Turning now to the drawings, FIG. 1 shows a typical microcontroller M in accordance with the present invention. The microcontroller M provides a highly integrated CPU 36 with a complete set of peripherals that are a superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability, write protection, and code execution control for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36, the PCI master controller 80, and external PCI bus masters. The memory space and I/O space of the PCI bus 82 are accessible by the CPU 36 and PCI masters.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMA controller 22, and the PCI host bridge 18 on behalf of an external bus master requesting access to DRAM. The PCI bus arbiter 68 may arbitrate between five possible PCI masters.

A processor bus interface 77 is responsible for DMA cache snooping, dynamic clock speed adjusting, dynamic bus sizing, ready signal consolidation, Memory Mapped Configuration Region (MMCR) control, and general purpose address control. A bus interface unit, or BIU, 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and support for up to 256 megabytes of DRAM. The DRAM controller 20 may service requests from the CPU 36, the PCI host bridge 18 on behalf of an external PCI master, or the general purpose bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdogs timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

A debug core 42 provides an integrated debug interface for embedded hardware/software debug during a special debug mode. Controllability and observability may be achieved through a fast JTAG-compliant serial interface.

A PCI host bridge 18 is integrated into the microcontroller M which allow; the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes three industry standard programmable interrupt controllers (PICs) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mc-de. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 10 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FLFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second time-out with a 33 MHz CPU clock.

The PC/AT compatibility logic 74 provides PC/AT-compatible functions. The PC/AT compatible integrated peripherals include the DMA controller 22, the PIT 62, 1he PIC 48, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Non-Concurrent Mode

Figure 2:
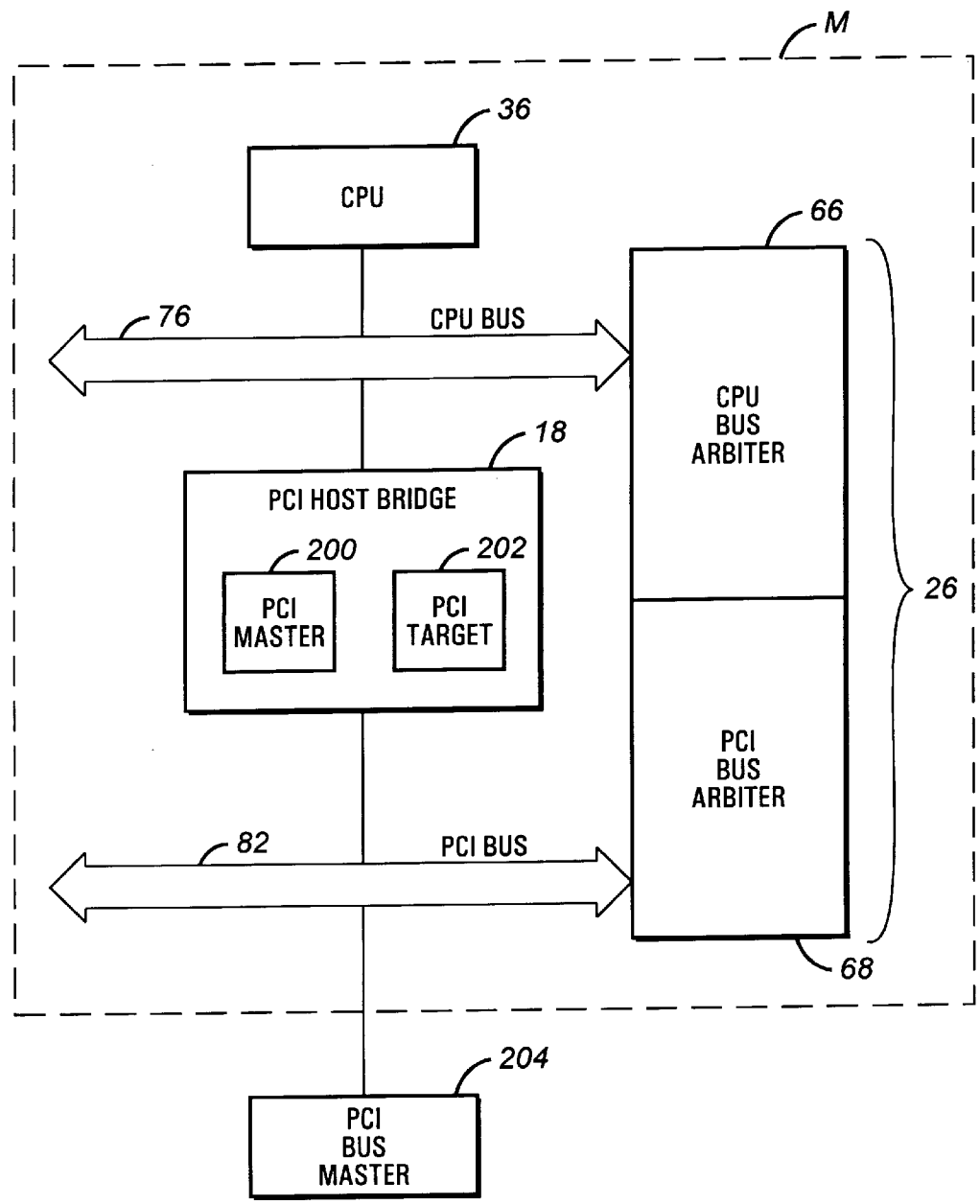
FIG. 2 is a block diagram of the microcontroller of FIG. 1 showing the processor, processor bus, processor bus arbiter, peripheral component interconnect (PCI) host bridge, PCI bus, and PCI bus arbiter.

Referring to FIG. 2, certain components of the microcontroller M relevant to a non-concurrent mode are shown. The microcontroller M includes the CPU bus 76 coupled to the PCI bus 82 by the PCI host bridge 18. The PCI host bridge 18 includes a PCI master 200 and a PCI target 202. The PCI master 200 generally serves as a master of the PCI bus 82 when the PCI bus 82 is not owned by an external PCI master. The PCI bus 82 is further coupled to an external PCI bus master 204. The CPU bus 76 is coupled to the CPU 36 and the CPU bus arbiter 66. Similarly, the PCI bus 82 is coupled to its own bus arbiter 68.

The illustrative components shown in FIG. 2 can be used in connection with a non-concurrent mode of the microcontroller M. For example, if the PCI bus master 204 requests ownership of the PCI bus 82, then the PCI host bridge 18 attempts to acquire ownership of the CPU bus 76. In a disclosed embodiment, ownership of the PCI bus 82 may only be granted to the PCI bus master 204 if the PCI host bridge 18 owns the CPU bus 76. In effect, during a non-concurrent mode, the CPU bus 76 and the PCI bus 82 are treated as one bus in the sense that a bus master must acquire ownership of both buses. In a disclosed embodiment, write posting from the CPU 36 to the PCI bus 82 is disabled in the non-concurrent mode, because completing the write cycle on the CPU bus 76 followed by a later completion of the write cycle on the PCI bus 82 implies a disconnect between the CPU bus 36 and the PCI bus 82.

The non-concurrent mode can be applied to various multi-bus architectures. For example, the non-concurrent mode can be used to arbitrate access for processor buses, non-processor buses, peripheral buses, and/or non-peripheral buses. It should be understood that the PCI bus 82 is shown only as an example of a peripheral bus. Further, while two buses are shown in FIG. 2, it should be understood that the non-concurrent mode may be applied to multi-bus architectures including more than two buses.

Figures 3, 4:
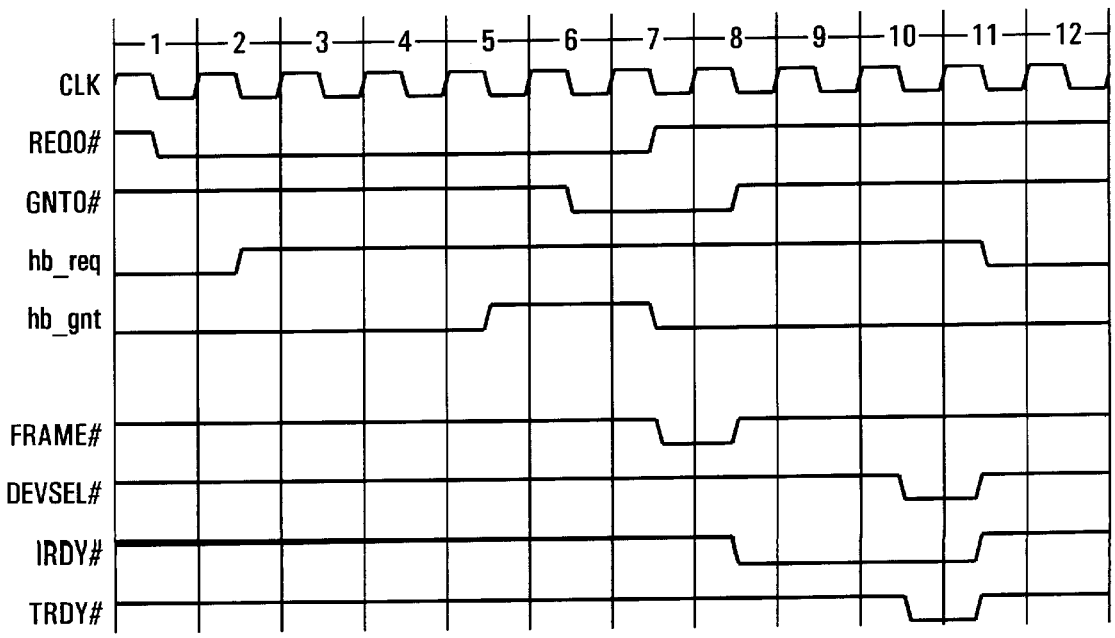
FIG. 3 is an illustration of a system arbiter control register of the system arbiter of FIG. 1 containing a system arbiter concurrent mode enable bit and a peripheral bus arbiter park bit.
FIG. 4 is a timing diagram for arbitration of a peripheral component interconnect (PCI) bus in accordance with an exemplary non-concurrent mode of the PCI arbiter Of FIG. 1 and FIG. 2.

Referring to FIG. 3, a system arbiter control register SYSARBCTL is shown. In the disclosed embodiment, the system arbiter control register SYSARBCTL is used in connection with the non-concurrent mode. Bit 1 of the arbiter control register SYSARBCTL, which is named CNCR_MODE_ENB, serves as a concurrent mode enable bit. If the concurrent mode enable bit is set to '0', then the system arbiter 26 operates in a non-concurrent mode. If the concurrent mode enable bit is set to '1', then the system arbiter 26 operates in a concurrent mode. In a concurrent mode of the system arbiter 26, arbitration of the CPU bus 76 is independent of the arbitration of the PCI bus 82. In a non-concurrent mode of the system arbiter 26, arbitration of the CPU bus 76 is dependent upon arbitration of the PCI bus 82. One advantage of the non-concurrent mode is reduced debug complexity since simultaneous transactions by different masters do not occur on the PCI bus 82 and the CPU bus 76. In a disclosed embodiment, the microcontroller M boots up in the non-con-current mode until the con-current mode enable bit is set. When debugging the microcontroller M, the con-current mode enable bit is riot set.

Bit 2 of the system arbiter control register SYSARBCTL is named BUS_PARK_SEL and serves as a PCI bus arbiter park bit. This bit controls which PCI master the PCI bus arbiter 68 will park on when the PCI bus 82 is idle. If the PCI bus arbiter park bit is set to '0', then the PCI bus 82 is parked on the CPU 26. If the PCI bus arbiter park bit is set to '1', then the PCI bus 82 is parked on the last PCI master that acquired the PCI bus 82. During a non-con-current mode of the system arbiter 26, the PCI bus arbiter park bit is set to '0'such that the PCI bus 82 is parked on the CPU 36.

The system arbiter control register SYSARBCTL further includes a bit 0 (GNT_TO_INT_ENB)which serves as a PCI bus arbiter grant time-out interrupt enable bit. This bit is used to enable interrupts that are generated when the PCI bus arbiter 68 detects, a grant time-out. If the PCI bus arbiter grant time-out interrupt enable bit is set to '0', then PCI bus arbiter interrupts are disabled. If the PCI bus arbiter grant time-out interrupt enable bit is set to '1', then PCI bus interrupts are enabled. As shown, bits 3–7 are reserved for future use. In the disclosed embodiment, only bits 1–2 of the system arbiter control register SYSARBCTL are relevant to the non-con-current mode.

In the disclosed embodiment, the PCI bus arbiter 68 is organized into next PCI master logic NXT_PCI_REQ and a PCI arbiter state machine PCIARB_SM. The next PCI master logic NXT_PCI_REQ is generally used to determine a next PCI bus master to be granted the PCI bus 82, and the PCI arbitration state machine PCIARB_SM generally serves as a main state machine for the PCI bus arbiter 68. Based on a predetermined priority scheme, the PCI arbitration state machine PCIARB_SM informs the next PCI master logic NXT_PCI-REQ which PCI_master should be granted the PCI bus 82 by asserting an appropriate GNT# signal.

The PCI arbitration state machine PCIARB_SM supports the non-con-current mode. In the non-con-current mode, when any external PCI request is asserted, the PCIARB_SM forces the PCI host bridge 18 to assert a host bridge request to the CPU bus arbiter 66. This request informs the CPU bus arbiter 66 that the PCI host bridge 18 is seeking ownership of the CPU bus 76. The CPU bus arbiter 66 can grant the CPU bus 76 to the PCI host bridge 18 after completion of a next processor bus transaction. This technique is identical to the technique used in con-current mode when a transaction needs to go from the PCI bus 82 to the CPU bus 76. One advantage of using the same technique is that the CPU bus arbiter 66 does not need to determine whether con-current mode or non-concurrent mode is enabled before responding to the host bridge request. When the PCI host bridge 18 is granted the CPU bus 76, the PCIARB_SM will grant the PCI bus 82 to the external PCI master. The host bridge request to the CPU bus arbiter 66 is forced asserted for the entire duration of the external PCI master transaction so as to maintain ownership of the CPU bus 76 by the PCI host bridge 18. In effect, the PCI bus arbiter 68 is parked on the CPU 36. One advantage of parking the PCI bus arbiter 68 on the CPU 36 is that the CPU 36 does not have to request ownership of the PCI bus 82 for each external access by the CPU 36. This advantage applies to all CPU bus 76 masters. This simplifies the interaction between the PCI bus arbiter 68 and the CPU bus arbiter 66 because only the PCI bus arbiter has to arbitrate for the CPU bus, but the CPU bus masters do not have to arbitrate for the PCI bus 82, because the PCI bus 82 is owned by the CPU bus masters by default. After the external PCI master transaction completes, the PCIARB_SM releases the host bridge request to the CPU bus arbiter 66. Similarly, in a disclosed embodiment, the CPU 36 must own the PCI bus 82 in the non-con-current mode for the CPU 36 to be granted the CPU bus 76. It should be understood that certain exceptions to the non-concurrent mode can be carved out, if desired.

Figure 5:
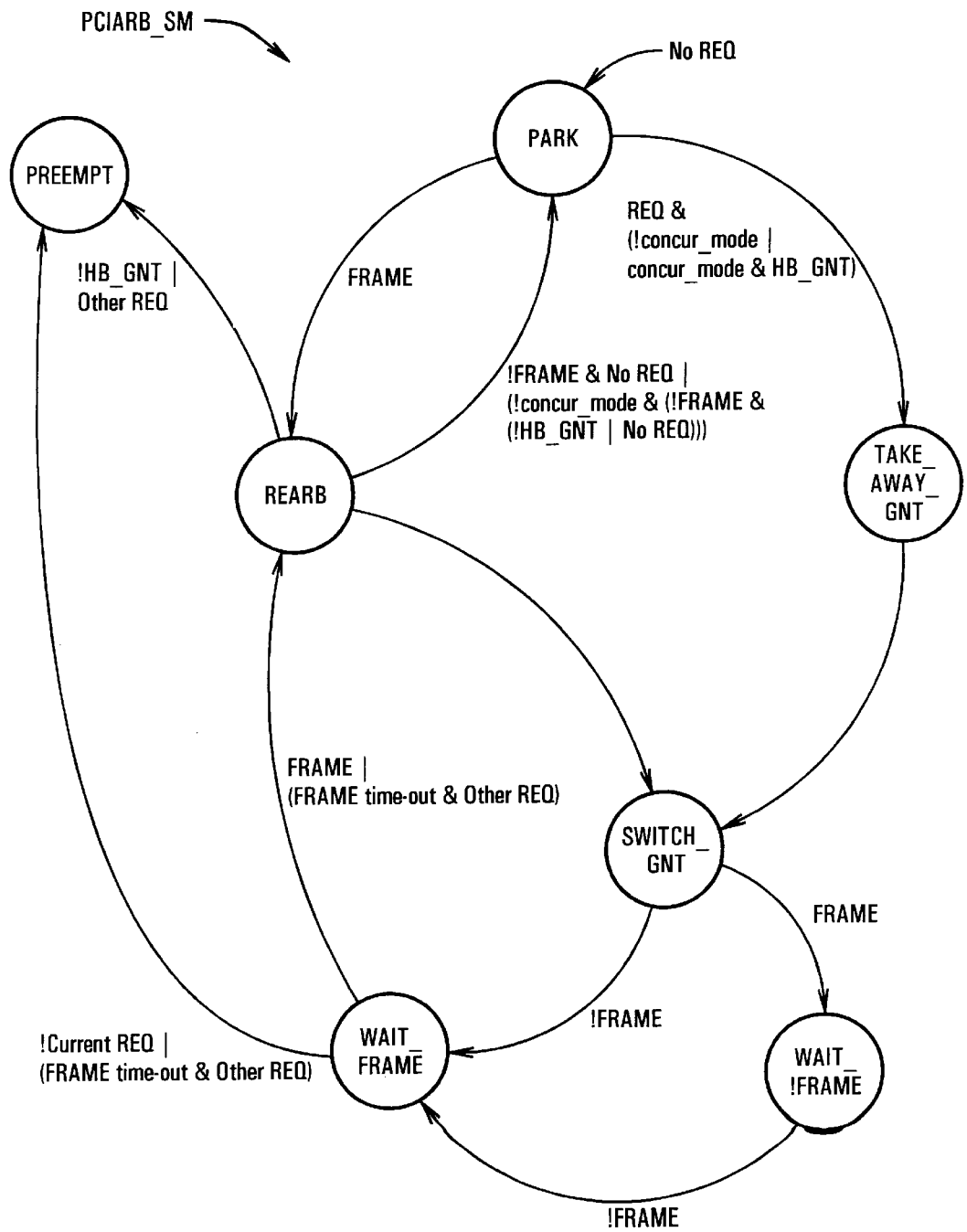
FIG. 5 is a state diagram of the PCI arbiter of FIG. 1 and FIG. 2 in accordance with the exemplary non-concurrent mode.

Referring to FIG. 5, an exemplary state diagram for the PCI arbitration state machine PCIARB_SM is shown. The states of the PCIARB_SM include a PARK state, a REARB state, a PREEMPT state, a TAKE_AWAY_GNT state, a SWITCH_GNT state, a WAIT_FRAME state, and a WAIT_!FRAME state. The PCIARB_SM is in a PARK state when no external PCI master is requesting the PCI bus 82. The absence of a REQ# signal indicates that no external PCI master is requesting the PCI bus 82. For the non-concurrent mode, in the PARK state, the PCI bus 82 is parked on the CPU 36. The PCIARB_SM transitions from the PARK state to the TAKE_AWAY_GNT state when the external PCI master 204 has requested the PCI bus 82. Assertion of the REQ# signal serves as an indication that an external PCI master is requesting the PCI bus.

From the TAKE_AWAY_GNT state, the PCIARB_SM transitions to the SWITCH_GNT state. As noted above, to own the PCI bus 82, the external PCI master 204 must first be granted the CPU bus 76. As such, the PCI host bridge 18 requests ownership of the CPU bus 76 on behalf of the external PCI master 204. If a higher priority master is requesting the CPU bus 76, then the PCIARB_SM will not transition to the TAKE_AWAY_GNT state until the PCI host bridge 18 is granted the CPU bus 76.

An hb_gnt signal is deasserted in the PREEMPT state. This condition is represented in FIG. 5 as !HB_GNT. The deasserted state of the hb_gnt signal indicates that the PCI host bridge 18 is not granted the CPU bus 76. Thus, the PCI bus arbiter 68 deasserts the hb_gnt signal to preempt a bus master.

In the SWITCH_GNT state, the PCI bus 82 is granted to a next master-. In the non-concurrent mode, the transition from the REARB state to the SWITCH_GNT state occurs if the current PCI transaction is complete, the PCI host bridge 18 first is granted the CPIU bus 76, and an external PCI bus master is requesting the PCI bus 82. If these conditions are not met, then the PCIARB_SM transition from the REARB state back to the PARK state. When a next master is not the CPU 36, a CPU GNT counter is incremented every SWITCH_GNT state. The CPU GNT counter counts the number of external PCI grants since the last CPU cycle on the PCI bus 82. The relative CPU priority on the PCI bus 82 is programmable to give the CPU 36 the PCI bus 82 after every 1, 2, or 3 external PCI master bus tenures.

From the SWITCH_GNT state, the PCIARB_SM can transition to the WAIT_FRAME state or the WAIT_!FRAME state. If a PCI transaction is in progress on the PCI bus 82, then a FRAME# signal is in an asserted state. If a PCI transaction is not in progress on the PCI bus 82, then the FRAME# signal is in a deasserted state. When the FRAME# signal is in an asserted state, the PCIARB_SM transitions from the SWITCH_GNT state to the WAIT_!FRAME state. When the FRAME# signal is in a deasserted state, PCIARB_SM transitions from the SWITCH_GNT state to the WAIT_FRAME state. The PCIARB_SM transitions from the WAIT_!FRAME state to the WAIT_FRAME state if the FRAME# signal is deasserted. Since a GNT# signal is asserted in the SWITCH_GNT state asserting the FRAME# signal begins a PCI transaction on the PCI bus 82. In the WAIT_FRAME state, the PCIARB_SM waits for the current transaction to start. In the WAIT_FRAME state, the PCIARB_SM waits for a previous PCI transaction to complete. If the FRAME# signal is asserted, then the PCIARB_SM transitions from the WAIT_FRAME state to the REARB state.

The PCIARB_SM transitions from the PARK state to the TAKE_AWAY_GNT state when a REQ signal is asserted in a non-con-current mode. The TAKE_AWAY_GNT state clears a currently pending GNT signal. The PCIARB_SM transitions from the TAKE_AWAY_GNT state to the SWITCH_GNT state described above.

Referring to FIG. 4, a timing diagram in accordance with the non-con-current mode is shown. As represented in FIG. 4, the REQ0#, GNT0#, FRAME#, DEVSEL:#, IRDY#, and TRDY# signals are active low. Using the standard convention that a signal name with an #-character following the name indicates a signal which is asserted at a logic low instead of at a logic high. The general use of these PCI signals is understood in the art. The hb_gnt and hb_req signals shown generally serve to facilitate ownership of the CPU bus 76 by the PCI host bridge 18. The illustrated timing diagram runs from clock #1 through clock #12. Al clock #1, the external PCI master 204 requests the PCI bus 82 by asserting a REQ0# signal. At clock #2, the PCI bus arbiter 68 samples an external PCI request (REQ0#) asserted and then asserts a host bridge request (hb_req) to the CPU bus arbiter 66. The external PCI master maintains a GNT0# signal as deasserted until the PCI host bridge 18 is granted the CPU bus 76. At clock #5, the CPU bus arbiter 66 determines that the PCI host bridge 18 will be granted the CPU bus 76 and asserts an hb_gnt signal to the PCI host bridge 18. The assertion of hb_gnt can be delayed if a higher priority master was requesting the CPU bus 76.

At clock #6, the PCI bus arbiter 68 detects that the PCI host bridge 18 has been granted the CPU bus 76 (as indicated by assertion of hb_gnt) and asserts GNT0# to the external PCI master 204. At clock #7, the CPU bus arbiter 66 rearbitrates to determine a next bus master to be granted the CPU bus 76 and deasserts the hb_gnt signal to the PCI host bridge 18. The PCI host bridge 18 maintains ownership of the CPU bus 76 until hb_req is deasserted. In addition, during clock #7, the external PCI master 204 samples GNT0# asserted and asserts. FRAME# to begin the PCI transaction. Next, at clock #8, the GNT0# signal is deasserted, the FRAME# signal is deasserted, and the IRDY# signal is asserted. The states of the GNT0#, FRAME#, and IRDY# signals indicate that the PCI bus 82 is owned. At clock #11, the PCI host bridge 18 samples the end of the PCI transaction and has sampled hb_gnt deasserted. The PCI host bridge 18 deasserted hb_req to allow the next bus master access to the CPU bus 76. The deassertion of the IRDY# and TRDY# signals indicate completion of the PCI transaction.

The foregoing disclosure and description of the various embodiments are illustrative and explanatory thereof, and various changes in the arbitration logic, buses, arbitration protocol, components, circuit elements, circuit configurations, signal timing, and signal connections, as well as in the details of the illustrated circuitry and construction and method of operation may be made without departing from the spirit and scope of the invention. It should be understood that a non-concurrent mode is applicable to arbitrating access for two or more buses and to arbitrating access for processor buses, non-processor buses, peripheral buses, and/or non-peripheral buses.

We claim:

1. A method of arbitrating access to a processor bus and a peripheral bus, comprising the steps of:

detecting a peripheral bus request for the peripheral bus by a bus master;

generating a processor bus request for the processor bus in response to detecting the peripheral bus request independent of the transaction to be performed by the bus master; and granting the bus master ownership of the peripheral bus if the bus master is granted ownership of the processor bus.

2. A method as in claim 1, further comprising the step of:

maintaining ownership of the processor bus by the bus master until the bus master releases ownership of the peripheral bus.

3. A method as in claim 1, the generating step comprising the step of:

generating the processor bus request for the processor bus by a peripheral bus host bridge on behalf of the bus master.

4. A method as in claim 1, the granting step comprising the step of:

granting the bus master ownership of the peripheral bus if a peripheral bus host bridge is granted ownership of the processor bus.

5. A method as in claim 1, further comprising the step of:

detecting if the bus master is granted ownership of the processor bus.

6. A method as in claim 1, further comprising the step of:

disabling write posting from a processor to the peripheral bus.

7. A microcontroller, comprising:

a processor bus;

a processor coupled to the processor bus;

a peripheral bus host bridge coupled to the processor bus;

a peripheral bus coupled to the peripheral bus host bridge; and a peripheral bus arbiter configured to force the peripheral bus host bridge to generate a host bridge request for the processor bus in response to detecting a peripheral bus request by a bus master independent of the transaction to be performed by the bus master and to grant the bus master ownership of the peripheral bus if the peripheral bus host bridge is granted ownership of the processor bus.

8. A microcontroller as in claim 7, further comprising:

a processor bus arbiter coupled to the processor bus to detect the host bridge request and to grant the processor bus to the peripheral bus host bridge after completion of a next processor bus transaction.

9. A microcontroller as in claim 7, wherein the peripheral bus arbiter is parked on the processor until the bus master releases ownership of the processor bus.

10. A microcontroller as in claim 7, wherein the bus master is the processor.

11. A microcontroller as in claim 7, wherein the bus master comprises an external peripheral bus master.

12. A microcontroller as in claim 7, the peripheral bus arbiter comprising:

a concurrent mode enable bit to enable and disable a con-current mode in which the peripheral bus arbiter is configured to grant a bus master ownership of the peripheral bus independent of ownership of the processor bus.

13. A microcontroller as in claim 12, the concurrent mode enable bit disabling concurrent mode at boot-up for debugging processor bus and peripheral bus transactions.

14. A microcontroller as in claim 7, the peripheral bus arbiter comprising:

a peripheral bus arbiter park bit to control parking on the peripheral bus by a bus master.

15. A microcontroller as in claim 7, wherein the peripheral bus comprises a peripheral component interconnect (PCI) bus.

16. A microcontroller as in claim 7, wherein the bus master owns the processor bus and the peripheral bus if the peripheral bus host bridge is granted ownership of the processor bus.

17. A microcontroller as in claim 7, further comprising:

a write posting disable bit to disable write posting from the processor to the peripheral bus.

18. A peripheral bus arbiter adapted for non-concurrent operation of a processor bus and a peripheral bus, the arbiter comprising:

a means for detecting a peripheral bus request for a peripheral bus by a master;

a means for generating a processor bus request for a processor bus by the bus master in response to detecting the peripheral bus request independent of the transaction to be performed by the bus master; and a means for granting the bus master ownership of the peripheral bus if the bus master is granted ownership of the processor bus.

19. The peripheral bus arbiter of claim 18, further comprising:

a means for maintaining ownership of the processor bus by the bus master until the bus master releases ownership of the peripheral bus.

20. The peripheral bus arbiter of claim 18, further comprising:

a means for detecting if the bus master is granted ownership of the processor bus.

* * * * *